Patented July 31, 1945

2,380,614

UNITED STATES PATENT OFFICE 2,380,614

METHOD OF MAKING CATALYSTS

Waldo L. Semon, Silver Lake, Ohio, assignor to The B. F. Goodrich Company, New York, N. Y., a corporation of New York No Drawing. Application July 16, 1941, Serial No. 402,629

6 Claims. (Cl. 23—105)

This invention relates to the preparation of heavy metal complexes useful as catalysts in polymerization reactions, and has as its principal object to provide a method whereby metal catalysts of high activity may be obtained.

Many heavy metal complexes, especially those which are capable of catalyzing oxidation-reduction reactions and are for this reason sometimes called redox systems, are valuable catalysts or accelerators for polymerization reactions. The use of certain heavy metal complexes in connection with the polymerization of unsaturated organic compounds, particularly butadiene hydrocarbons, is described in the copending applications of William D. Stewart, Serial Nos. 379,713 to 379,717, filed February 14, 1941, and other heavy complexes similarly may be employed.

It has been found that the activity of the heavy metal complexes as catalysts for polymerization is dependent on the purity of the heavy metal salt from which they are prepared. Many commercially available simple heavy metal salts such as ferric chloride and ferric sulfate contain impurities which have an undesirable effect on polymerization reactions. Heavy metal complexes prepared from these impure salts either have a rather low catalytic activity or may in some cases fail entirely to function as polymerization catalysts. Since very small amounts of impurities are capable of affecting the polymerization in this manner, it is necessary to produce a salt of extremely high purity for conversion into a heavy metal complex of the highest activity.

I have now discovered that a heavy metal salt may be separated from impurities which deleteriously affect polymerization by the conversion of the heavy metal salt into an alkali metal heavy metal oxalate, and that the oxalate may be employed as a source of heavy metal to form other heavy metal complexes useful as catalysts in polymerization reactions.

The conversion of the heavy metal salt into an alkali metal heavy metal oxalate may be effected by any one of a number of known means. One satisfactory method is to react the heavy metal salt with an alkali metal hydroxide, such as a sodium or potassium hydroxide, and oxalic acid in aqueous solution and obtain the alkali metal heavy metal oxalate as a crystalline precipitate by cooling the reaction mixture. Alternatively, the heavy metal salt may be reacted directly with an alkali metal oxalate to form an alkali metal heavy metal oxalate. The oxalate prepared by either of these methods is in a high state of purity entirely free from substances ordinarily present in commercially available heavy metal salts and, consequently, is especially adapted for use in the preparation of other heavy metal complexes.

The preparation of the heavy metal complexes to be used as catalysts in polymerization reactions from the alkali metal heavy metal oxalate may be effected simply by treating the oxalate with the other component or components of the particular complex desired. Any compound, either organic or inorganic, which is capable of combining, reacting or otherwise associating with any salt of a heavy metal to form a heavy metal complex (or a redox system) which is useful in accelerating or catalyzing polymerization reactions, may be treated with an alkali metal heavy metal oxalate to produce a heavy metal complex of increased catalytic activity. Many such compounds are disclosed in the copending applications of William D. Stewart, Serial Nos. 379,713 to 379,717, filed February 14, 1941, mentioned hereinabove. The treatment of the alkali metal heavy metal oxalate with such other compounds may be accomplished advantageously by adding an aqueous solution of the oxalate to the other compound or, if it is water soluble as is ordinarily the case, to an aqueous solution thereof.

As a specific example of the method of this invention potassium ferri oxalate is prepared as follows: 120 lbs. of oxalic acid are placed in a 50 gal. stainless steel drum, 35 gal. of water are added, and 105 lbs. of 95% solid potassium hydroxide are slowly added with stirring. The stirring is continued while 75.5 lbs. of molten commercial $FeCl_3 \cdot 6H_2O$ are added and the mixture is then filtered while still hot. The filtrate is then cooled to about 10° C. whereupon potassium ferri oxalate appears as a crystalline precipitate. This crystalline precipitate is filtered from the mother liquor and dried at 40–50° C. The yield of potassium ferri oxalate from commercial ferric chloride is 90% and the product is substantially 100% pure. Since the product decomposes rapidly in the presence of light, it is stored in an amber colored container until used.

A heavy metal complex polymerization catalyst is then prepared from the potassium ferri oxalate obtained as above by adding .214 g. of potassium ferri oxalate to an aqueous solution containing .65 g. of sodium pyrophosphate. The resulting solution is believed to contain the complex iron-phosphorus compound known as sodium ferri pyrophosphate which is an excellent polymerization catalyst. When a mixture of butadiene and methyl methacrylate is polymerized in an aqueous emulsion employing this solution as the polymerization catalyst, the polymerization requires only 31½ hours at 30° C. while a similar polymerization using a catalyst prepared by treating commercial ferric chloride with potassium pyrophosphate requires 65 hours and a polymerization using no catalyst requires 78 hours.

When a cobalt salt such as commercial cobaltic chloride or nitrate is substituted for ferric chloride in the above example, an alkali metal cobaltic oxalate, which likewise may be converted into a complex of increased activity, is obtained. It is apparent that complex heavy metal catalysts prepared from an alkali metal heavy metal oxalate are much more efficient as catalysts than those prepared from ordinary commercial heavy metal salts.

Although the method of this invention has been specifically described in relation to the preparation of a complex polymerization catalyst containing iron combined with a pyrophosphate, it is to be understood that the method is applicable generally to the preparation of any heavy metal complex polymerization catalyst. Thus any simple heavy metal salt may be converted into an alkali metal heavy metal oxalate and the oxalate then treated with a compound capable of combining therewith to form the complex desired. The heavy metal salt used in the preparation of the oxalate may be any simple salt, preferably a water soluble salt such as a chloride, nitrate or sulfate of a heavy metal such as iron, cobalt, nickel, copper, chromium, molybdenum, mercury, silver, platinum or the like. The term "heavy metal" as used herein is employed in its usually accepted sense to designate those metals which have a low atomic volume and which occur substantially in the center of a periodic table in which the elements are arranged in long and short periods, or which occur in groups VIII, I-B, II-B, VI-A and VII-A of the periodic table of Mendelyeev. Such metals readily form coordinated compounds and in such compounds exhibit a coordination number or valence of 4, 6 or 8. The salts of iron, cobalt and nickel and other heavy metals which have a coordination number of six are preferred in the practice of this invention since such salts are most easily converted into alkali metal heavy metal oxalates.

As mentioned hereinabove the alkali metal heavy metal oxalate may be used to prepare various heavy metal catalysts by treating the oxalate with the other component or components of the complex. Thus instead of treating the alkali metal heavy metal oxalate with an alkali pyrophosphate, as in the specific example, to form a heavy metal pyrophosphate complex, the oxalate may be treated with various organic acids such as amino or hydroxy acids to form heavy metal-organic acid complexes; or with other organic compounds such as polyhydroxy compounds or certain sulfur compounds to form other heavy metal complexes useful as polymerization catalysts.

Other variations and modifications in the proportions of the various compounds used and in the method of forming the alkali metal heavy metal oxalate and its use in the preparation of heavy metal complex polymerization catalysts, will occur to those skilled in the art and may be made without departing from the spirit and scope of the invention as defined in the appended claims.

I claim:

1. The method of making a catalyst for polymerization reactions, said catalyst comprising a complex heavy metal pyrophosphate in a high degree of purity, which comprises reacting in aqueous solution an alkali metal heavy metal oxalate and an alkali metal pyrophosphate.

2. The method of making a catalyst for the aqueous emulsion polymerization of butadiene, said catalyst comprising an aqueous solution of a complex heavy metal pyrophosphate in a high degree of purity, which comprises adding an alkali metal heavy metal oxalate to an aqueous solution of an alkali metal pyrosphosphate.

3. The method of claim 2 wherein the heavy metal is a heavy metal occurring in group VIII of the periodic table.

4. The method of claim 2 wherein the heavy metal is iron.

5. The method of claim 2 wherein the heavy metal is cobalt.

6. The method of making a catalyst for the aqueous emulsion polymerization of butadiene, said catalyst comprising an aqueous solution of sodium ferri pyrophosphate in a high degree of purity, which comprises reacting in aqueous solution in alkali metal ferri oxalate and sodium pyrophosphate.

WALDO L. SEMON.